(12) United States Patent
Bell et al.

(10) Patent No.: US 7,587,661 B2
(45) Date of Patent: Sep. 8, 2009

(54) IDENTIFYING DESIGN ISSUES IN ELECTRONIC FORMS

(75) Inventors: Joshua S. Bell, Kirkland, WA (US);
Nicholas K. Dallett, Kirkland, WA (US);
Willson Kulandai Raj David, Woodenville, WA (US); David M. Snow, Redmond, WA (US); Dafina I. Toncheva, Seattle, WA (US); Aleksandr Tsybert, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 11/335,208

(22) Filed: Jan. 19, 2006

(65) Prior Publication Data

US 2007/0168849 A1 Jul. 19, 2007

(51) Int. Cl.
*G06F 11/00* (2006.01)
(52) U.S. Cl. ........................ 714/799; 714/758
(58) Field of Classification Search ................ 714/799, 714/20, 47, 46, 48, 54, 57, 45, 758
See application file for complete search history.

(56) References Cited

U.S. PATENT DOCUMENTS

| | | | |
|---|---|---|---|
| 6,415,435 B1 | 7/2002 | McIntyre | |
| 6,963,997 B2 * | 11/2005 | Maly et al. | 714/20 |
| 7,213,176 B2 * | 5/2007 | Banko | 714/38 |
| 7,266,734 B2 * | 9/2007 | Chavez et al. | 714/48 |
| 7,343,541 B2 * | 3/2008 | Oren | 714/758 |
| 2002/0194219 A1 | 12/2002 | Bradley et al. | |
| 2003/0188260 A1 | 10/2003 | Jensen et al. | |

OTHER PUBLICATIONS

Ramkumar Chinchani et al "ARCHERR: Runtime Environment Driven Program Saftey" 9th European Symposium on Research in Computer Security Sophia Antipolis, French Riviera, France—Sep. 12-15(ESORICS 2004), LNCS 3193, pp. 385-406, 2004, See abstract, pp. 385-387.
Robert Barnett "Testing Electronis Forms" Canberra, Australia: Robert Barnett and Associates Pty Ltd, 1998, http://www.rbainformationdesign.com.au/TESTEF.pdf.
International Search Report dated Jun. 28, 2007 for Application No. PCT/US2007/001643, 8 pages.

* cited by examiner

*Primary Examiner*—Scott T Baderman
*Assistant Examiner*—Fritz Alphonse
(74) *Attorney, Agent, or Firm*—Merchant & Gould P.C.

(57) ABSTRACT

A technology for identifying design issues during an electronic form generating process is provided. In one method approach, a user selected runtime environment to be applied to an electronic form is received. A form design check is performed on the electronic form. A reporting object generates a list of design issues identified by the form design check. The list of design issues is displayed in a user interface.

19 Claims, 14 Drawing Sheets

500

RECEIVING A USER SELECTED RUNTIME ENVIRONMENT TO BE APPLIED TO AN ELECTRONIC FORM DOCUMENT.
502

↓

PERFORMING A FORM DESIGN CHECK ON THE ELECTRONIC FORM DOCUMENT.
504

↓

GENERATING A LIST OF POTENTIAL ERRORS IDENTIFIED BY THE FORM DESIGN CHECK, THE LIST OF POTENTIAL ERRORS GENERATED IN A REPORTING OBJECT.
506

↓

DISPLAYING THE LIST OF POTENTIAL ERRORS IN A USER INTERFACE.
508

↓

SELECTING A CONTROL IN A FORM DESIGN AREA IN RESPONSE TO A USER INTERACTION WITH ONE OF THE DISPLAYED POTENTIAL ERRORS.
510

↓

SCROLLING THE SELECTED CONTROL INTO VIEW.
512

↓

HIGHLIGHTING THE SELECTED CONTROL TO PROVIDE A VISUAL INDICATOR OF THE POTENTIAL ERROR.
514

↓

PRESENTING A DIALOG MESSAGE DESCRIBING THE POTENTIAL ERROR.
516

RECEIVING GUIDELINES FOR FORMATTING AN ELECTRONIC FORM DOCUMENT.

602

PERFORMING A FORM DESIGN CHECK ON THE ELECTRONIC FORM DOCUMENT, THE FORM DESIGN CHECK PERFORMED BY A PLURALITY OF DESIGN CHECKER OBJECTS APPLYING RULES CONSISTENT WITH THE RECEIVED GUIDELINES.

604

GENERATING A LIST OF POTENTIAL ERRORS IDENTIFIED BY THE FORM DESIGN CHECK, THE LIST OF POTENTIAL ERRORS GENERATED IN A REPORTING OBJECT.

606

DISPLAYING THE LIST OF POTENTIAL ERRORS IN SINGLE TASK PANE OF A USER INTERFACE.

608

PRESENTING A DIALOG BOX CONTAINING CONTEXT SPECIFIC ERROR TEXT, THE DIALOG BOX PRESENTED IN RESPONSE TO A USER INTERACTION WITH ONE OF THE POTENTIAL ERRORS DISPLAYED IN THE TASK PANE.

Design a form ? X

Runtime compatibility

Select the runtime compatibility that the form will be compatible with. The form design experience will be optimized for the capabilities of the runtime and incompatibilities will be shown.

Compatible With:

| Default ▷ | — 810

Design a form which runs on the present version of this electronic form designer program. The form will take advantage of all the runtime features for the current version of this electronic form designer program.

Backwards compatibility

[✓] Show report on compatibility with previous versions of this electronic form designer program.

820

| OK | | Cancel |

IDENTIFYING DESIGN ISSUES IN ELECTRONIC FORMS

BACKGROUND

When designing an electronic form (a form to be filled out on a computer) with an electronic form designer program, there are many errors that can occur during the electronic form design process. Errors can be introduced at a variety of times during the design process and can be attributed to a variety of problems such as import problems, formatting problems, compatibility problems, runtime problems, and the like.

A location incompatibility error is an example of an easy to make error. A location incompatibility error might occur due to the fact that some electronic forms have features that work when the electronic form is used on a stand alone computer, but do not work when the electronic form is used in a different runtime environment. If, for example, an electronic form is designed for use on a stand-alone computer, more elaborate capabilities such as spell checking and file attachments may be available and embedded as functionality within the electronic form. However, if the same electronic form is then place on a web server so that it can be filled out with a web browser, the more elaborate capabilities may not be available for use, thus causing a location incompatibility error.

The location incompatibility error is only one of many potential design errors that can occur during an electronic form design process. These potential design errors can vary in severity and scope. Certain errors will prevent an electronic form from working, while more subtle errors can cause the electronic form to behave differently than intended. Error conditions in electronic forms are undesirable because they can cause a poor user experience for the eventual user of the electronic form. Additionally, error conditions in electronic forms can corrupt the data that an electronic form is designed to help capture.

Because errors are undesirable, it is important and useful to identify them and eliminate them during the design process. To assist in the identification and removal of errors, electronic form design programs often flag or report potential design errors during the execution of a step or a process that is associated with a certain type of error. This single warning is often the only time a user of an electronic form design program is made aware of a design issue that is an error or can potentially cause an error. For instance, an import error might only be reported to the user of an electronic form design program during the import of a file. As another example, an incompatibility error may only be reported to the user of an electronic form design program during a publishing phase of the electronic form. Identifying and fixing a single error can thus be a very time consuming process, if it is not fixed immediately when is identified. Appraised a user of errors in this sporadic manner, can make electronic form design, error identification, and error elimination very time consuming processes.

There are numerous potential sources of errors during the electronic form design process. Many of these numerous error sources report errors only when the errors initially occur, or when an action, such as publishing the electronic form, reveals the error. The numerous sources and methods of identifying errors make it difficult for a user to be aware of all the errors that exist or potentially exist at any given time. While learning about the errors is useful to the user of an electronic form design program, the above-described methods of identifying and reporting the errors can be frustrating, inconsistent, and very inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for identifying design issues during an electronic form generating process is disclosed. In one method approach, a user selected runtime environment to be applied to an electronic form is received. A form design check is performed on the electronic form. A reporting object generates a list of design issues identified by the form design check. The list of design issues is displayed in a user interface.

DESCRIPTION OF THE DRAWINGS

The accompanying drawings, which are incorporated in and form a part of this specification, illustrate embodiments of the technology for identifying design issues in electronic forms and, together with the description, serve to explain principles discussed below:

FIG. 5 is a flow chart of operations performed in accordance with one embodiment of the present technology for identifying design issues in electronic forms.

FIG. 6 is a flow chart of operations performed in accordance with one embodiment of the present technology for identifying design issues in electronic forms.

FIG. 8 is a diagram of one embodiment of a dialog box of the present system for identifying design issues in electronic forms.

DETAILED DESCRIPTION

Reference will now be made in detail to embodiments of the present technology for identifying design issues in electronic forms, examples of which are illustrated in the accompanying drawings. While the technology for identifying design issues in electronic forms will be described in conjunction with various embodiments, it will be understood that they are not intended to limit the present technology for identifying design issues in electronic forms to these embodiments. On the contrary, the presented technology for identifying design issues in electronic forms is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for identifying design issues in electronic forms. However, the present technology for identifying design issues in electronic forms may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for identifying design issues in electronic forms is also well suited to the use of other computer systems such as, for example, optical and mechanical computers. Additionally, it should be understood that in embodiments of the present technology for identifying design issues in electronic forms, one or more of the steps can be performed manually.

EXAMPLE COMPUTER SYSTEM ENVIRONMENT

Figure 1:
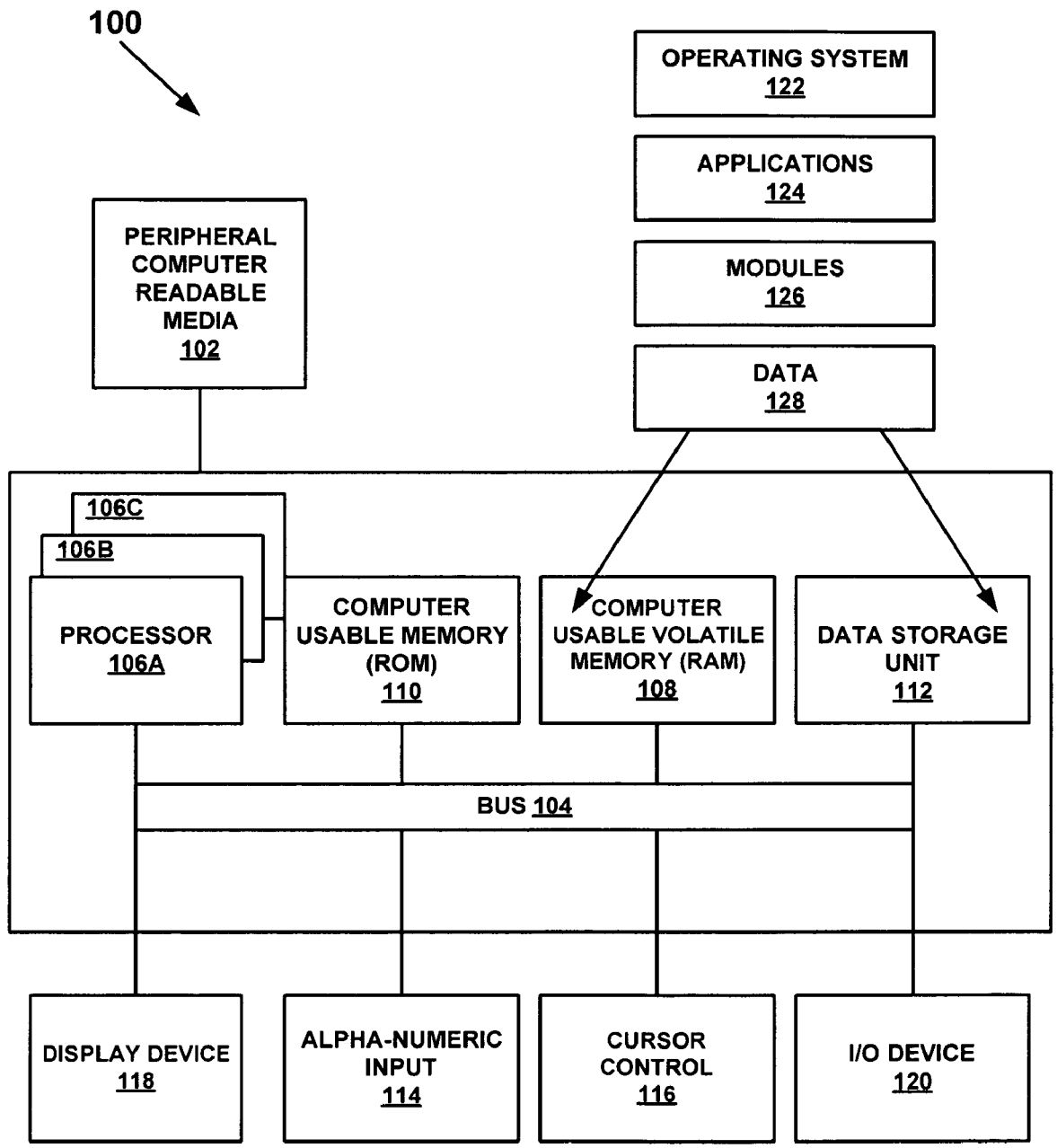
FIG. 1 is a diagram of an exemplary computer system used in accordance with embodiments of the present technology for identifying design issues in electronic forms.

With reference now to FIG. 1, portions of the technology for identifying design issues in electronic forms are composed of computer-readable and computer-executable instructions that reside, for example, in computer-usable media of a computer system. That is, FIG. 1 illustrates one example of a type of computer that can be used to implement embodiments, which are discussed below, of the present technology for identifying design issues in electronic forms. FIG. 1 illustrates an exemplary computer system 100 used in accordance with embodiments of the present technology for identifying design issues in electronic forms. It is appreciated that system 100 of FIG. 1 is exemplary only and that the present technology for identifying design issues in electronic forms can operate on or within a number of different computer systems including general purpose networked computer systems, embedded computer systems, routers, switches, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1, may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for identifying design issues in electronic forms is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for identifying design issues in electronic forms, for example, is stored as an application 124 or module 126 in memory locations within RAM 108 and memory areas within data storage unit 112.

General Description of the Technology for Identifying Design Issues in Electronic Forms As an overview, in one embodiment, the present technology for identifying design issues in electronic forms is directed towards a method for identifying potential problems that may occur during an electronic form design process. In one embodiment, these design issues are identified by a plurality of design checker objects. A reporting object collects and categorizes the identified design issues and formats them for display to the user in a single design checker task pane of a user-interface. This single consolidated display of a list of identified design issues provides the user with a consistent experience for recognizing and interacting with potential problems throughout the design of an electronic form. Additionally, in various embodiments, this single display of the list of design issues serves as a starting point for various functions. These functions include, for example, locating the sources of design issues within the electronic form being designed, correcting design issues, and quickly verifying that design issues have been corrected within the electronic form.

Exemplary System

Figure 2:
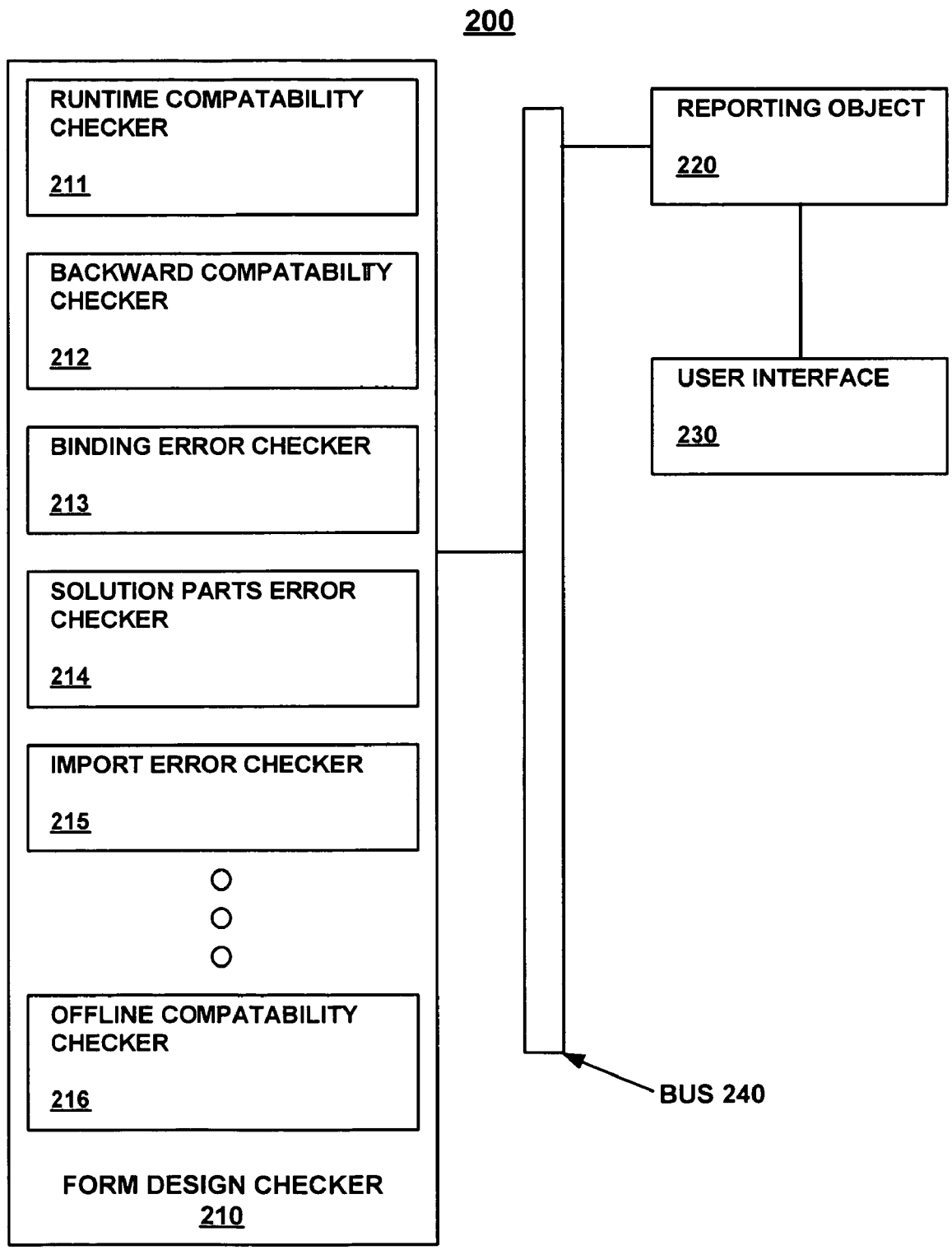
FIG. 2 is a diagram of one embodiment of the present system for identifying design issues in electronic forms.

With reference now to FIG. 2, a diagram of one embodiment of the present system 200 for identifying design issues in electronic forms. The following discussion will begin with a description of the physical structure of the present system for identifying design issues in electronic forms. This discussion will then be followed with a description of the operation of the present invention. With respect to the physical structure, system 200 is comprised of a form design checker 210, a reporting object 220, a user interface 230, and a bus 240 for message passing. Form design checker 210 is coupled via bus 240 to reporting object 220. User interface 230 is coupled via a two-way coupling to reporting object 220.

Form design checker 210 serves as a central design checker object for registration of a plurality of client form design checker objects, comprised of: runtime compatibility checker 211, backward compatibility checker 212, binding error checker 213, solution parts error checker 214, import error checker 215, and offline compatibility checker 216. Although six client form design checker objects (211-216) are shown it should be appreciated that more or less are possible. Each form design checker object (211-216) is for checking for a specific source of errors within an electronic form. For example, runtime compatibility checker 211 checks specifically for runtime compatibility errors in an electronic form.

When some action triggers an initial error check or an error check refresh of an electronic form, design checker object 210 queries the registered client form design checker objects 211-216 for a list of potential design errors. The potential design errors are then reported to reporting object 220. In one embodiment, each of the client objects is coupled to bus 240 and reports potential design errors independently to reporting object 220. In another embodiment the potential design errors identified by client objects 211-216 are coupled through design checker object 210 to reporting object 220. In one embodiment, the individual design checker objects 211-216 also generate warning messages based on the identified potential design errors. Any generated warning messages are also received by reporting object 220.

Reporting object 220 consolidates reported potential errors to generate a single of list of design issues. In an embodiment where warnings are also received by reporting object 220, the warnings are available for consolidation into the list of design issues. In one embodiment, reporting object 220 also comprises logic to generate warnings based on the potential design errors that are reported to it. In such an embodiment, these warnings are also available to be compiled into the list of design issues that is generated by reporting object 220. The consolidated list of design issues can be comprised of potential design errors, warnings, or some combination of potential design errors and warnings.

User interface 230 is coupled to reporting object 220 for receiving design issue lists compiled by reporting object 220. User interface 230 also provides selected information to reporting object 220 that is received in response to user interactions with various portions of user interface 230. As an example, in one embodiment, user interface 230 provides reporting object 220 with guidelines for formatting an electronic form. Reporting object 220 utilizes this guideline information to guide the generation of lists of design issues. Additionally, in one embodiment, reporting object 220 also couples this guideline information to form design checker 210 for use in guiding the client form design checker objects (211-216) in what errors to check for.

Figure 3:
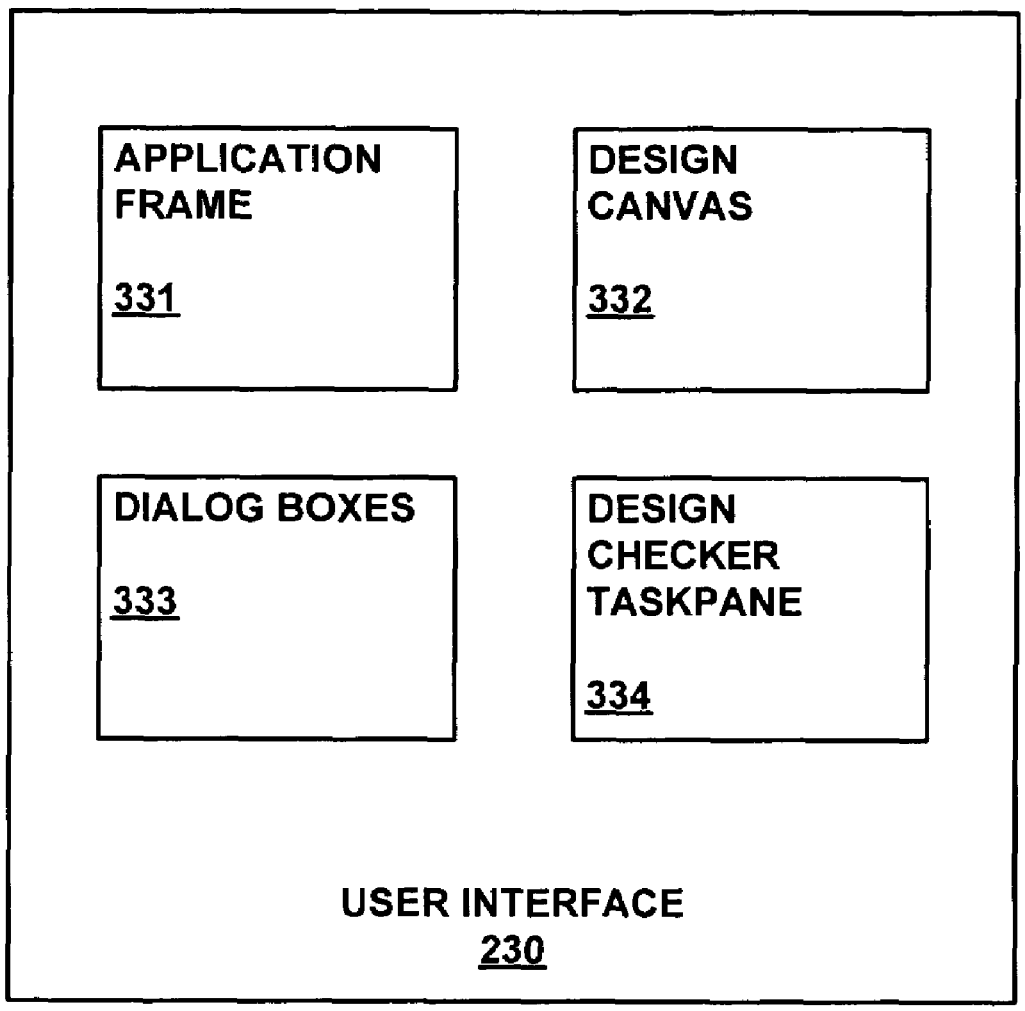
FIG. 3 is a diagram of one embodiment of a user interface of the present system for identifying design issues in electronic forms.

FIG. 3 is a diagram of one embodiment of a user interface 230 of the present system 200 for identifying design issues in electronic forms. In the embodiment represented by FIG. 3, user interface 230 is comprised of an application frame 331, a design canvas 332, dialog boxes 333, and a design checker task pane 334.

In FIG. 3, application frame 331 is a top-level area where all of the elements of user interface 230 are displayable to a user. Application frame 331 is suited for inclusions of other elements of a user interface such as are commonly known in typical graphical user interface computing environments. Dialog boxes 333 are used to perform a variety of functions such as providing information to a user, prompting a user to provide information, providing a user with a selectable link, or some combination of these or other known uses for dialog boxes. The design canvas 332 portion of user interface 230 is for designing an electronic form. Design canvas 322 displays the electronic form to a user and is also used to enable interaction with a user. Design checker task pane 334 of user interface 230 is for displaying design issues, such as warnings and potential design errors that have been identified with an electronic form being designed in design canvas 332.

Figure 4:
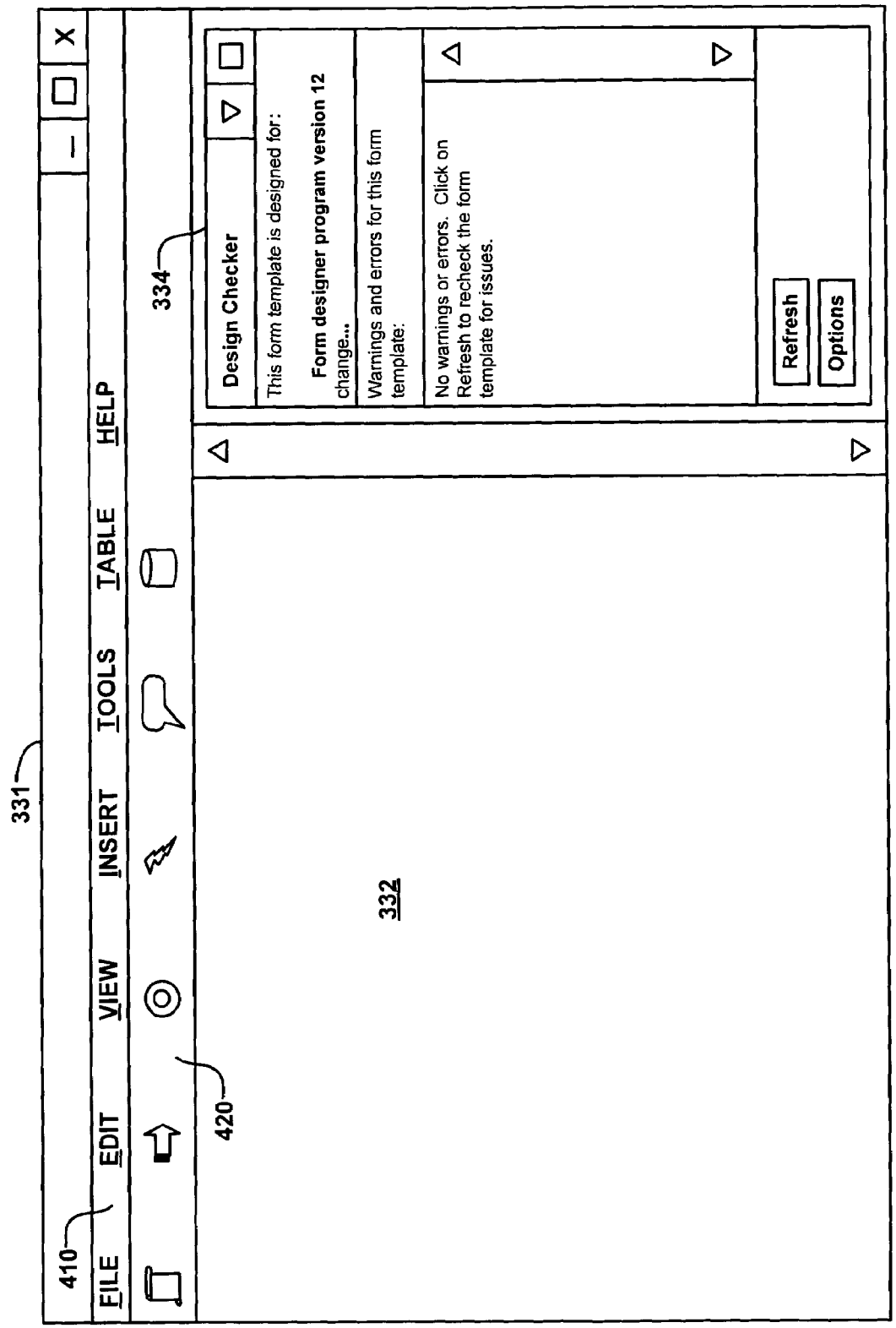
FIG. 4 is a diagram of one embodiment of an application frame utilizing the present system for identifying design issues in electronic forms.

FIG. 4 is a diagram of one embodiment of an application frame 331 utilizing the present system 200 for identifying design issues in electronic forms. Application frame 331 of FIG. 4 shows exemplary representations of a drop down menu 410 and an icon-based tool bar 420. Menu 410 and tool bar 420 are utilized in conjunction with a design canvas area 332 and a design checker task pane 334. Blank form design canvas 332 of FIG. 4 is a display that does not yet have elements of an electronic form represented within it. In FIG. 4, design checker task pane 334 is shown with no warnings or potential design errors displayed. Functionality associated with an embodiment of design checker task pane 334 is described in greater detail in conjunction with FIGS. 9A, 9B, and 9C below.

Exemplary Methods of Operation

The following discussion sets forth in detail the operation of present technology for identifying design issues in an electronic form. With reference to FIGS. 5 and 6, flow charts 500 and 600 each illustrate exemplary steps used by various embodiments of the present technology for identifying design issues in electronic forms. Flow charts 500 and 600 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow charts 500 and 600, such steps are exemplary. That is, embodiments are well suited to performing various other steps or variations of the steps recited in flow charts 500 and 600. It is appreciated that the steps in flow charts 500 and 600 may be performed in an order different than presented, and that not all of the steps in flow charts 500 and 600 may be performed.

Referring now to flow chart 500 of FIG. 5, at step 502, the present technology for identifying design issues in electronic forms receives a user selected runtime environment to be applied to an electronic form. A runtime environment is a compatibility choice made by the user via user interface 230, and defines what environments the electronic form is intended to be operable in. This is an important choice, as each runtime environment may offer a different set of application features to utilize with the electronic form. Additionally, each runtime environment choice also inherently imposes a different set of requirements for the construction of the electronic form.

As an example, a runtime environment typically specifies the platform that an electronic form is intended to be run on, such as, an individual computer, a server, or a web accessed electronic form that has data entered from a remote location. Receipt of a runtime environment guides the identification of design issues within an electronic form. In one embodiment, the present technology for identifying design issues in electronic forms prompts a user for a runtime environment as an initial step in the electronic form design process. The received runtime environment is one of a plurality of possible guidelines that governs the set of rules used to check for potential design errors that may arise during the design of an electronic form. In one embodiment, the runtime environment is received in response to a user-selection that is made at any point during the electronic form design process. This is useful in cases where the user may change the selected runtime environment after beginning the design of an electronic form. Such an approach also allows the user to see what sort of design issues may be present if an electronic form designed for one runtime environment is utilized in a different runtime environment.

Figure 7:
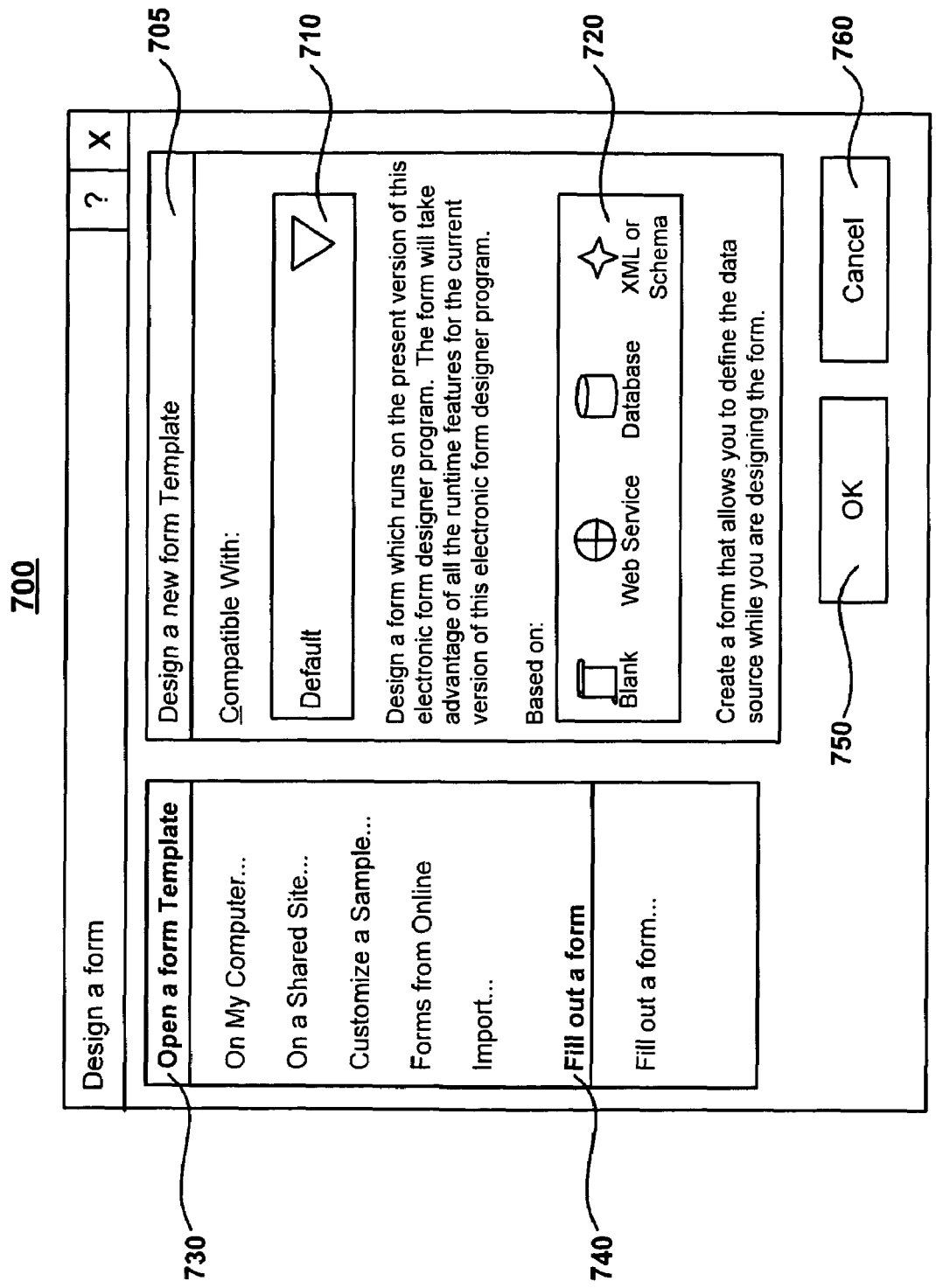
FIG. 7 is a diagram of one embodiment of a dialog box of the present system for identifying design issues in electronic forms.

Referring now to FIG. 7, a diagram of one embodiment of a dialog box 700 of the present system 200 for identifying design issues in electronic forms. Dialog box 700 is an example of a dialog box that can be presented to prompt a user for information at the beginning of an electronic form design process. Selectable area 705 allows a user to make a selection that will trigger the design of a new electronic form template. Selectable area 705 comprises area 710 that prompts a user for a compatibility input choice from a drop down menu that comprises a plurality of environments a newly designed electronic form can be designed to be compatible with. The compatibility choice can comprise a runtime environment, a version of an electronic form design program that the electronic form will be designed to be compatible with, or some combination of the two. Selectable area 705 also comprises area 720 that prompts a user for an input, from a plurality of selectable icons. Each of the selectable icons in area 720 allows selection of a data source for the electronic form. The data is sourced from locations such as a web service, a database, XML (Extensible Markup Language), or other.

One input selection area 730 allows a user to open an electronic form template from any one of a variety of selectable sources. Another input selection area 740 provides the user with a link to a selectable list of electronic forms that can be filled out. After any input selections are made, a user selects the OK button 750 to close dialog box 700, and proceed with the selected actions. The user is alternately able to select the cancel button 760 to close dialog box 700 and proceed without a selected action being invoked.

Referring now to FIG. 8, a diagram of one embodiment of a dialog box 800 of the present system 200 for identifying design issues in electronic forms is shown. Dialog box 800 is another example of a dialog box presented to prompt a user for information. Dialog box 800 is well suited for allowing a user to make selections about the design of an electronic form at anytime during the form design process. Selectable area 810 prompts a user for a runtime compatibility choice from a drop down menu. A runtime compatibility choice comprises: a runtime environment that an electronic form will be designed to run in; a version of an electronic form design program that the electronic form will be designed to be compatible with; or some combination of the two. Selectable area 820 is a specific example of a class of selectable areas for enabling compatibility checks that can optionally be included in dialog box 800. Selectable area 820, as shown, prompts the user to check or uncheck a selection that will cause reports to be generated that list design compatibility issues related to previous versions of an electronic form design program. After any input selections are made, a user selects the OK button 830 to close dialog box 800, and proceed with the selected actions. The user is alternately able to select the cancel button 840 to close dialog box 800 and proceed without a selected action being invoked.

Referring again to FIG. 5, at step 504 the present technology for identifying design issues in electronic forms performs a form design check on the electronic form. The form design check identifies potential design error conditions that are, or may become, design issues with the electronic form. In one embodiment, the form design check is performed automatically in response to user actions that may alter the form is such a way as to introduce potential design errors that have not previously been identified. For instance, after importing an electronic form document, a form design check is automatically performed to identify potential design errors that may appear as a result of importing a file. In another embodiment, a user can also selectively initiate a form design check. This selective initiation is accomplished, for instance, in response to a user interaction with a refresh button that is provided as a portion of user interface 230. A selective refresh tool is useful to refresh a list of design issues, after changes have been made in an electronic form under design.

The form design check is performed by a plurality of individual form design checker objects (211-216 of FIG. 2). Each individual form design checker object, 211 for instance, is dedicated to checking the electronic form for one category or source of errors. In one embodiment, the form design checker objects 211-216 are guided to test for design errors that are consistent with the runtime environment guideline that has been designated. In another embodiment, some of the design checker objects are guided to for errors, such as runtime errors, while other design checker objects simultaneously follow other guidelines and check for other errors. In yet other embodiments, other guidelines, in addition to a runtime environment, control the design errors that are tested for and identified by the various design checker objects 211-216.

The list of client form design checker objects 211-216 registered with form design checker 210 is extensible, in one embodiment. Extensibility allows a user to add additional design checker object clients, that are not a part of the original set of design checker objects delivered with the electronic form design checker software. Such an embodiment enables the addition of new features. In one embodiment, the extensibility also allows addition of third party design checker objects that are configured to work with the electronic form design software.

In one embodiment, the client design checker objects 211-216 are comprised of static form design checker objects and dynamic form design checker objects. Static form design checker objects, such as import error checker 215, only perform a design check in response to an event such as a file or attachment import. Thereafter, when refresh design checks are performed, static design checker objects only check the generated list of design issues and remove errors and warnings that are no longer applicable. Dynamic form design checker objects, such as backward compatibility checker 212, check for errors that can be introduced into the form design at any various times and locations within an electronic form design, as opposed to errors that occur only at certain points in the design process, e.g. creation or publishing. In one embodiment, dynamic form design checker objects perform a complete design check of the electronic form each time they are utilized to check for design errors or to refresh the list of design issues that has already been generated.

At step 506 of FIG. 5, the present technology for identifying design issues in electronic forms generates a list of design issues identified by the form design check; the list of potential design errors is generated by reporting object 220. The list of design issues is comprised of potential design errors and warnings that are held within the reporting object 220. In one embodiment, this list is structured in categories with each category containing listings of potential design errors and warnings that are related. For instance, in one embodiment, each category in the generated list corresponds directly to one or more of the plurality of design checker objects 211-216 that are each used to test for a certain category or source of error. For example, one category in the generated list of errors comprises runtime design issues that correspond to runtime compatibility checker 211. Another category comprises backward compatibility design issues that correspond to backward compatibility checker 212. Still other categories are comprised of design issues that correspond to other design checker objects. In one embodiment utilizing this method of generating a list of errors subdivided into categories, the list is generated with one category of errors corresponding to each design checker object 211-216. In such an embodiment, a single potential design error or warning that has been identified by, or is related to, more than one design checker object 211-216 appears multiple times in the list, listed under each category to which it relates.

At step 508 of FIG. 5, the present technology for identifying design issues in electronic forms displays the list of design issues in a user interface. The list of design issues, which is comprised of warnings and potential design errors, and is generated by the reporting object 220, is displayed so that a user can see the list. If the list of design issues is generated in categories as described above, the displayed list of design issues is subdivided into categories of design issues. In such an embodiment, each category of the plurality of categories of design issues corresponds to at least one of the plurality of design checker objects 211-216 that has identified a warning or potential design error in the design of the electronic form. Displaying the list of design issues subdivided in this manner aids a user in determining what significance a particular warning or potential design error condition has in relationship to the electronic form being designed.

In one embodiment, the list of design issues is displayed in a single design checker task pane 334 in the application frame 331 of user interface 230 (see FIGS. 3 and 4). Displaying identified design issues in a single area of user interface 230 gives the user a consistent experience for viewing and interacting with warnings and potential design errors that are identified as design issues in the design of the electronic form. This single display also serves as a single starting point for correcting the conditions that cause these design issues to be identified, reported, and displayed. An example of such a display is shown in FIG. 9A.

Figure 9A:
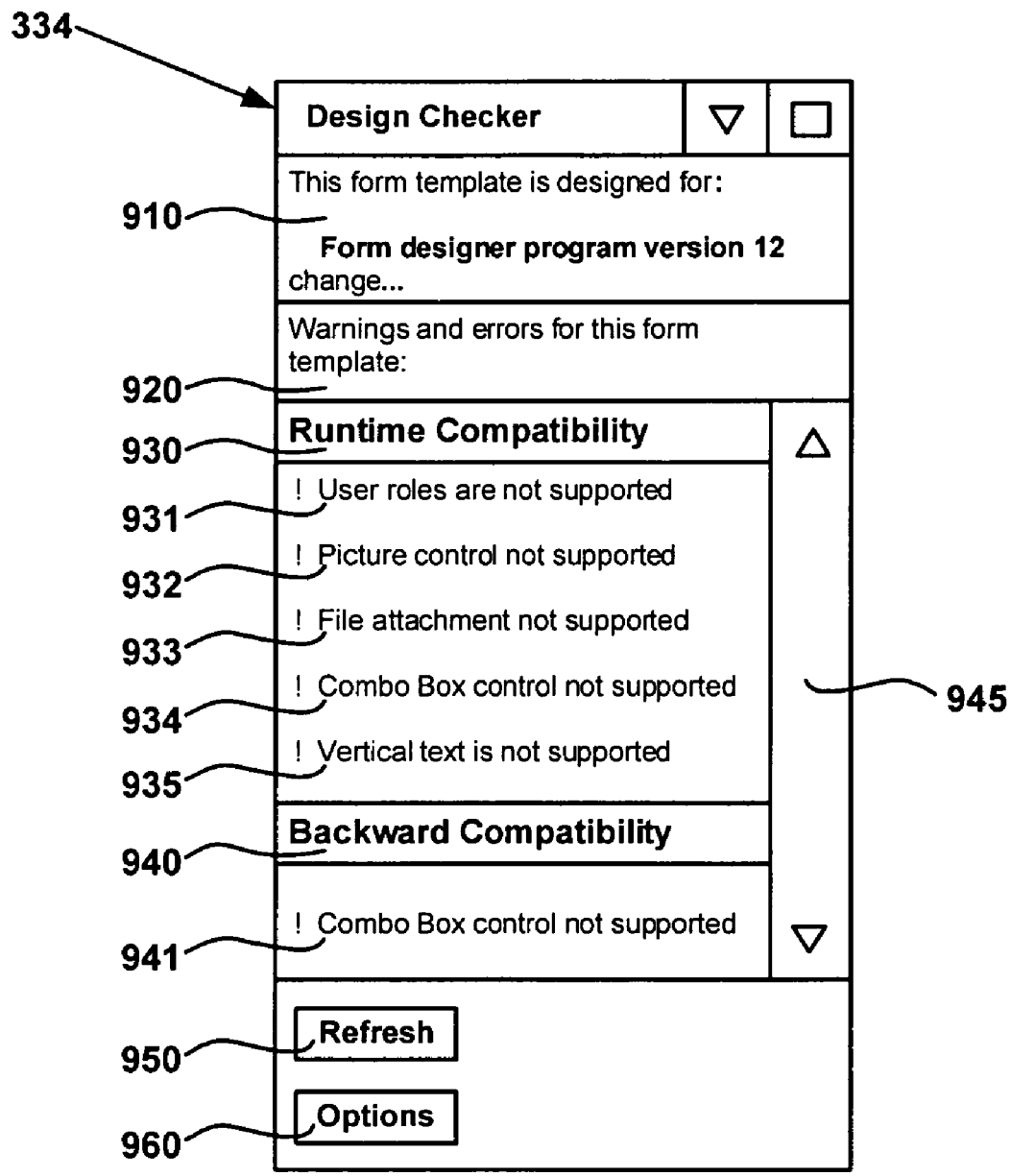
FIG. 9A is a diagram of one embodiment of a design checker task pane of the present system for identifying design issues in electronic forms.

FIG. 9A is a diagram of one embodiment of a design checker task pane 334 of the present system 200 for identifying design issues in electronic forms. In FIG. 9A, several sub-areas of design checker task pane 334 are identified. Area 910 provides an indicator of the compatibility choice associated with an electronic form that is currently being designed. Area 910 also serves as a user selectable link to a dialog box, such as dialog box 800, that will allow a user initiate change of the compatibility choice at any time during the form design process.

Selectable area 920 provides a visual display of design issues that have been identified with an electronic form under design. Selectable area 920 is subdivided into categories of design issues as represented by design issue category headings 930 and 940. Category heading 930 is associated with design checker object 211 (FIG. 2), and category heading 940 is associated with design checker object 212 (FIG. 2). Although two categories are displayed in FIG. 9A, in other embodiments additional or fewer categories are presented depending on the number of categories of identified design issues that are selected for display. Elements 931-935 represent user selectable design issues that are associated with category 930. Element 941 represents a user selectable design issue that is associated with category 940. A user scrolls through listed categories and design issues by interacting with scroll bar 945. User selection of refresh button 950 causes a refresh of the electronic form design check, and thereby refreshes the displayed design issues in area 920. User selection of options button 960 allows a user to select display options associated with design issues displayed in area 920. In one embodiment, one or more counter type numerical indicators (not shown) are displayed within design checker task pane 334 to give a user a quick visual representation of how many design issues, potential design errors, or warnings are listed. Such a counter type indicator allows a user to quickly determine whether a design action has added or removed design issues from the displayed list.

Figure 9B:
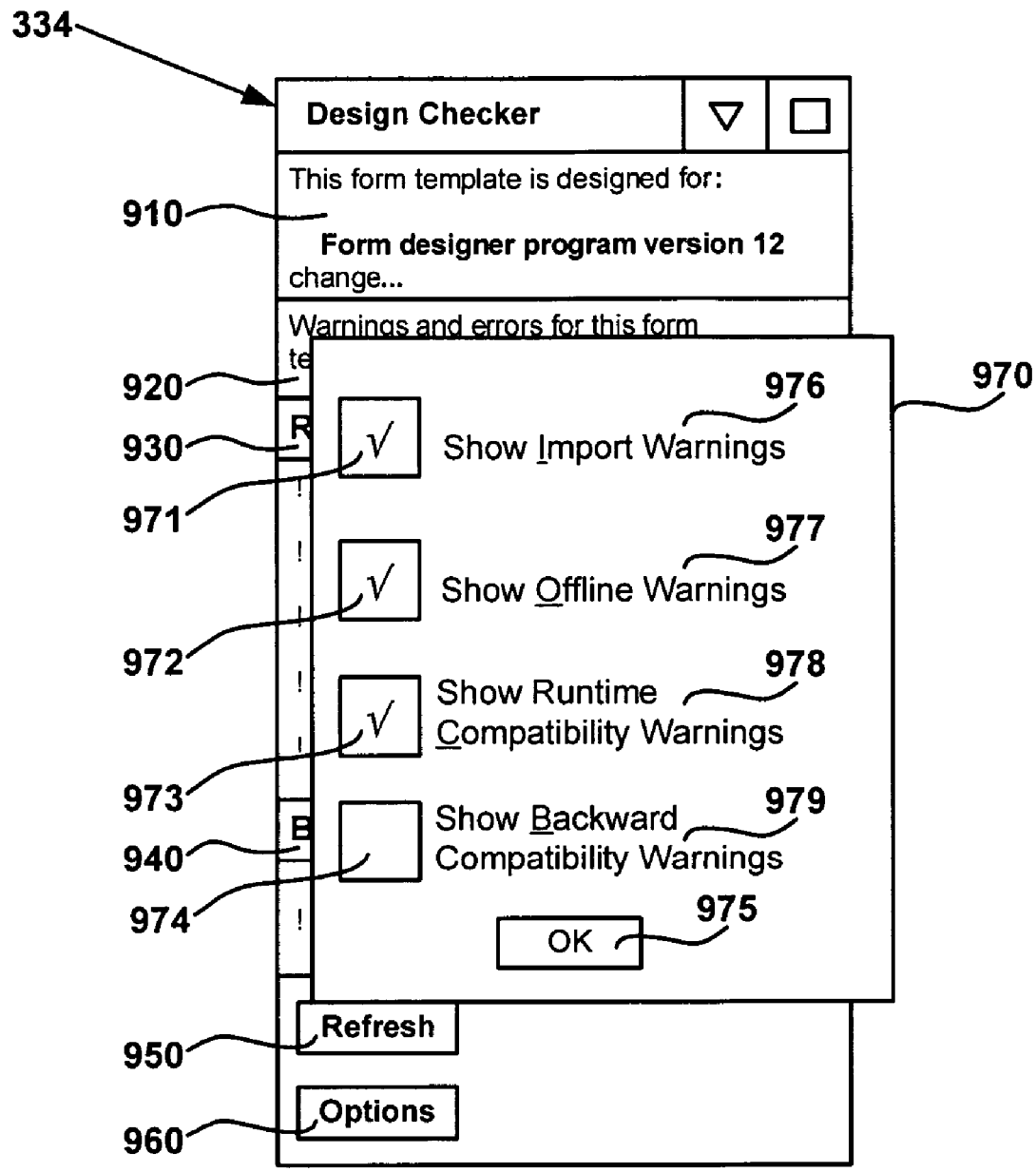
FIG. 9B is a diagram of one embodiment of a design checker task pane of the present system for identifying design issues in electronic forms.
Figure 9C:
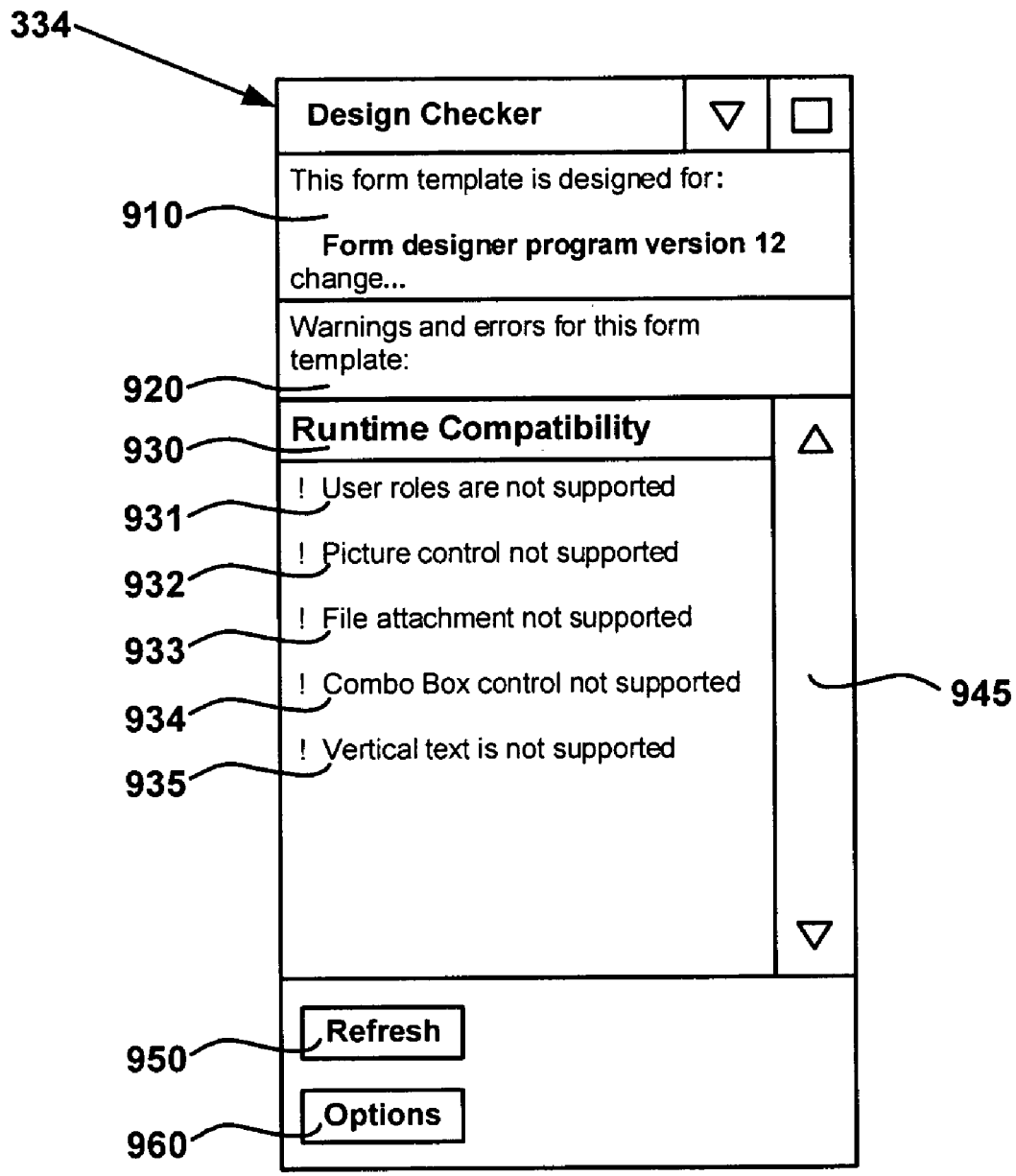
FIG. 9C is a diagram of one embodiment of a design checker task pane of the present system for identifying design issues in electronic forms.

One embodiment of design checker task pane 334 allows for suppressing display of at least one of the categories of design issues, in response to a user selection. This is useful to reduce the number of design issues displayed. It is also useful if a user has decided that a particular category of design issues is unimportant or has been sufficiently handled and therefore no longer needs to be displayed. Another embodiment, allows for suppressing display in the task pane of a subset of design issues of at least one of the categories of design issues, in response to a user selection. Suppressing a subset of a category of design issues is useful, for instance, if a user decides that a particular type of warning or potential design error is inconsequential or has been properly dealt with, but is still being displayed, such as, for example, in the case of a static form design checker object which generates a list of warnings one time and does not dynamically remove warnings as users correct the indicated problems. Selectively suppressing a particular warning or error subset, which may appear in one category or in several categories, prevents further display of the selected subset, without disabling the display of an entire category of issues. Utilizing this selective suppression option allows a user to structure a display of design issues, so that only design issues important to the user are displayed. FIGS. 9B and 9C demonstrate the optional suppression described above.

Referring now to FIG. 9B, a diagram of one embodiment of a design checker task pane 334 of the present system 200 for identifying design issues in electronic forms. FIG. 9B shows an exemplary options dialog box 970 that is triggered for display by a user selection of options button 960. Items 910, 920, 930, 940, 950, and 960 are the same as described in FIG. 9A. In the displayed embodiment, options dialog box 970 allows a user to selectively enable or disable the display of several categories 976-979 of warnings by adding or removing a check in a selectable box 971-974 next to each warning 976-979. As shown, area 974 has been deselected to disable the display of backward compatibility warnings 979. User selection of the OK button 975 will execute this de-selection option input.

It is appreciated that in other embodiments, additional or fewer selectable options can be presented to a user. In other embodiments, a dialog box such as dialog box 970 is also used to expand the levels of warnings and/or errors that are displayed. Additionally, in one embodiment, categories 976-979 serve as selectable text links. For instance, a selection of selectable text link 976 directs a user to an area for selectively choosing options such as how often an import warning or error is presented, or for choosing options to selectively enable or suppress display of subsets of categories of warnings and errors.

Referring now to FIG. 9C, a diagram of one embodiment of a design checker task pane 334 of the present system 200 for identifying design issues in electronic forms. FIG. 9C shows an exemplary result that flows from the deselection option input described in conjunction with FIG. 9B. Items 910, 920, 930-935, 945, 950, and 960 are the same as described in FIG. 9A. However, design issue category 940 and selectable design issue 941 are no longer shown in the display, due to the deselection of backward compatibility warnings that has taken place.

The design issues are comprised of warnings and potential design errors that have a large variety of sources. As previously described, design issues can be displayed in categories related to these sources. However, regardless of the source, each warning and potential design error in the list of design issues is also classified as belonging to one of three types of design issues, which are: display centric design issues, node centric design issues, and global design issues.

The type classification of a design issue governs the kind of information that is presented to a user to describe the design issue. Display centric design issues are visible areas in an electronic form, and thus a user can see this type of error in the electronic form. For example, if a picture does not import properly, a user can look at a, design canvas area 332 (see FIG. 3) of the electronic form design program and see that the imported picture is not being displayed properly in the electronic form that is being designed.

Node centric design issues are generally flaws in the data schema behind the display or in the properties, such as logic, associated with a node in an electronic form. A node centric error or warning is describable to the user, but does not show up as a visual error in an electronic form. For example, a user role may be associated with a particular node. However, if the selected user role is one that was not available in a previous version of the electronic form design program, then there is a potential backward compatibility error making this node of the electronic form incompatible when used in a previous program version. Though this node centric error presents a potential problem with the node, it does not show up visually as a flaw in the electronic form displayed in design canvas area 332.

Global design issues are items such as non-compatible features associated with an entire electronic form. For instance, choosing a setting that allows a completed form to be submitted via email. If the runtime environment target that the electronic form is being designed for does not support email submission, then this setting is a global error that can prevent use of the entire form. A global error is describable to the user, but it does not show up visually as a flaw in the electronic form displayed in design canvas area 332.

Referring again to FIG. 5, in one embodiment, at step 510 the present technology for identifying design issues in electronic forms selects a control in a form design area in response to a user interaction with one of the displayed design issues. This step describes a user interaction with a display centric design issue. This user interaction causes the user interface 230 (FIG. 2) of the electronic form design program to automatically select the control associated with the display centric design issue that the user has interacted with. The control is selected in the electronic form that is displayed, for instance, in the design canvas area 332 of the electronic form design program. Selecting the control places it in a condition for manipulation by the user.

Figure 10:
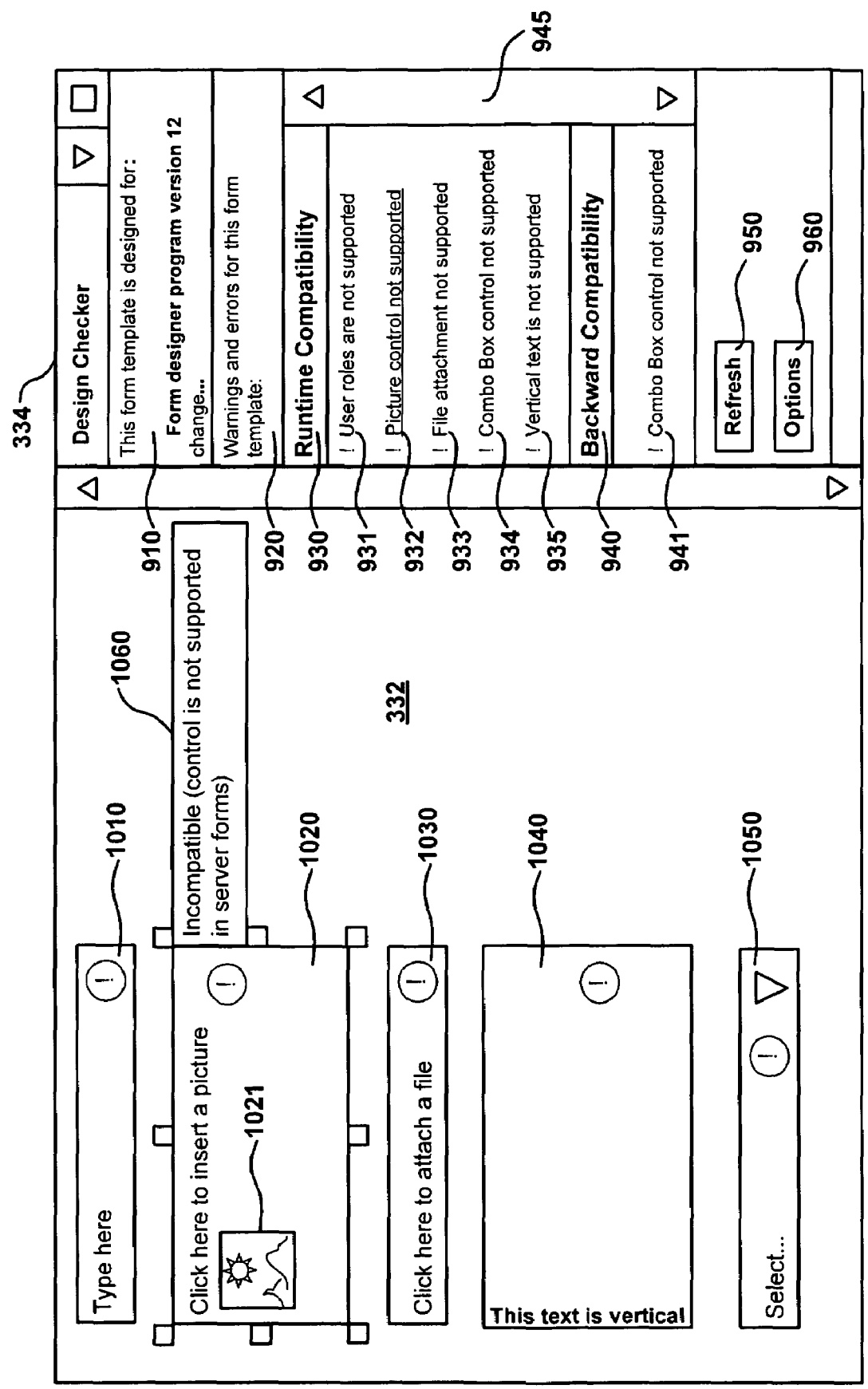
FIG. 10 is a diagram of one embodiment of a design canvas and design checker task pane of the present system for identifying design issues in electronic forms.

In one embodiment, each design issue displayed in design checker task pane 334 comprises a link to more information. By interacting with a displayed warning or potential design error in a certain manner, such as by using a cursor control device to click on it, a variety of other actions can be automatically initiated in response to the interaction. The nature of the other automatically initiated actions is governed by the type classification of the design issue that is interacted with, and the information available to be presented. FIG. 10 shows an example of a control being selected in response to a user interaction with a displayed display centric issue. A detailed discussion of FIG. 10 is provided below.

At step 512 of FIG. 5, in one embodiment, the present technology for identifying design issues in electronic forms scrolls the selected control into view. This step describes another automatic action initiated by a user interaction with a display centric design issue. If a selected control is not visible on the screen, the automatic scrolling will bring it into view by adjusting the displayed portion of the form such that the selected control is in the viewable design canvas area 332. If a selected control already visible on the screen in the design canvas area 332, the automatic scrolling repositions the selected control so that it is more easily viewed by and interacted with by a user. This can include actions such as centering the selected control in the design canvas area 332, or positioning the selected control as the topmost control in the design canvas area 332. In some instances, where a selected control is already properly positioned within the design canvas area 332 of the user interface the, automatic scrolling merely confirms the position of the control and takes no further action. Automatically scrolling a selected control on an electronic form into view in design canvas area 332 is useful because it presents the automatically selected control to the user in the viewable area of the design canvas 332. Automatically scrolling to the selected control in an electronic form saves time that a user would normally spend scrolling through a design canvas 332 of a user interface searching through the electronic form and trying to find the control associated with the error condition. FIG. 10 shows an example of a control being scrolled into view in response to a user interaction with a displayed display centric issue.

At step 514 of FIG. 5, in one embodiment, the present technology for identifying design issues in electronic forms highlights the selected control to provide a visual indicator of the potential design error. This step describes another automatic action initiated by a user interaction with a display centric design issue. Automatically highlighting the control, in response to a user interaction with a listed design issue makes it easy for a user to locate the control in, for instance, the design canvas area of a user interface. Highlighting can comprise shading the selected control to a different color than other controls. Highlighting the selected control can also comprise automatically performing other actions to draw user attention to the control. Highlighting actions can comprise automatic operations such as making the selected control flash, appear larger than normal, or present other visual identifiers to draw attention of a user.

At step 516 of FIG. 5, in one embodiment, the present technology for identifying design issues in electronic forms presents a dialog message describing the potential design error. This step describes another automatic action initiated by a user interaction with a display centric design issue. In one embodiment the dialog message automatically appears somewhere in the user interface, in response to a user inter action with a listed design issue. The dialog message, which can appear in the form of a dialog box, provides the user with more specific information about why a warning or potential design error condition has been identified as a design issue. In one embodiment, the dialog message is located adjacent to the selected control. In one embodiment, the dialog message also provides a suggestion related to how to correct the condition that caused the warning or potential design error to be identified. In one embodiment more than one dialog message is be presented. For instance a small message is presented in a box adjacent to a selected control, while a larger more detailed message is presented in a separate dialog box located somewhere within the viewing area of the user interface. FIG. 10 shows an example of a dialog box being presented adjacent to a control in response to a user interaction with a displayed display centric issue.

As mentioned above, FIG. 10 is a diagram of one embodiment of a design canvas 332 and design checker task pane 334 of the present system 200 for identifying design issues in electronic forms. FIG. 10 shows exemplary actions that take place in response to a user interaction with a selectable design issue 932 displayed in design checker task pane 334. Items 910-960 are the same as described in conjunction with FIG. 9A, with the exception that selectable item 932 has been selected by a user interaction. The text in selectable item 932 is underlined to represent this selection of item 932. Selectable item 932 is a display centric design issue that is related to a picture control that is not supported.

Design canvas area 332 is displayed in conjunction with design checker task pane 334. Areas 1010, 1020, 1030, 1040, and 1050 represent portions of an electronic form that is being designed in design canvas 332. In response to a user interaction with selectable design issue 932, the user interface of the form designer program has automatically selected area 1020, which is associated a picture area associated with selectable design issue 932 (picture control not supported). A small default error icon 1021 is presented as a visual indicator that a picture has been imported into area 1020, but for some reason is not being properly displayed. In addition to selection of area 1020, area 1020 has automatically been scrolled into the viewing area of design canvas 332, where it is optionally automatically highlighted (not shown). Additionally, an optional dialog box 1060 has been automatically presented adjacent to it. As shown in FIG. 10, box 1060, is a small message which is presented in a box adjacent to control area 1020, provides a user with further explanation of a design issue associated with selectable area 932 and control 1020.

Figure 11:
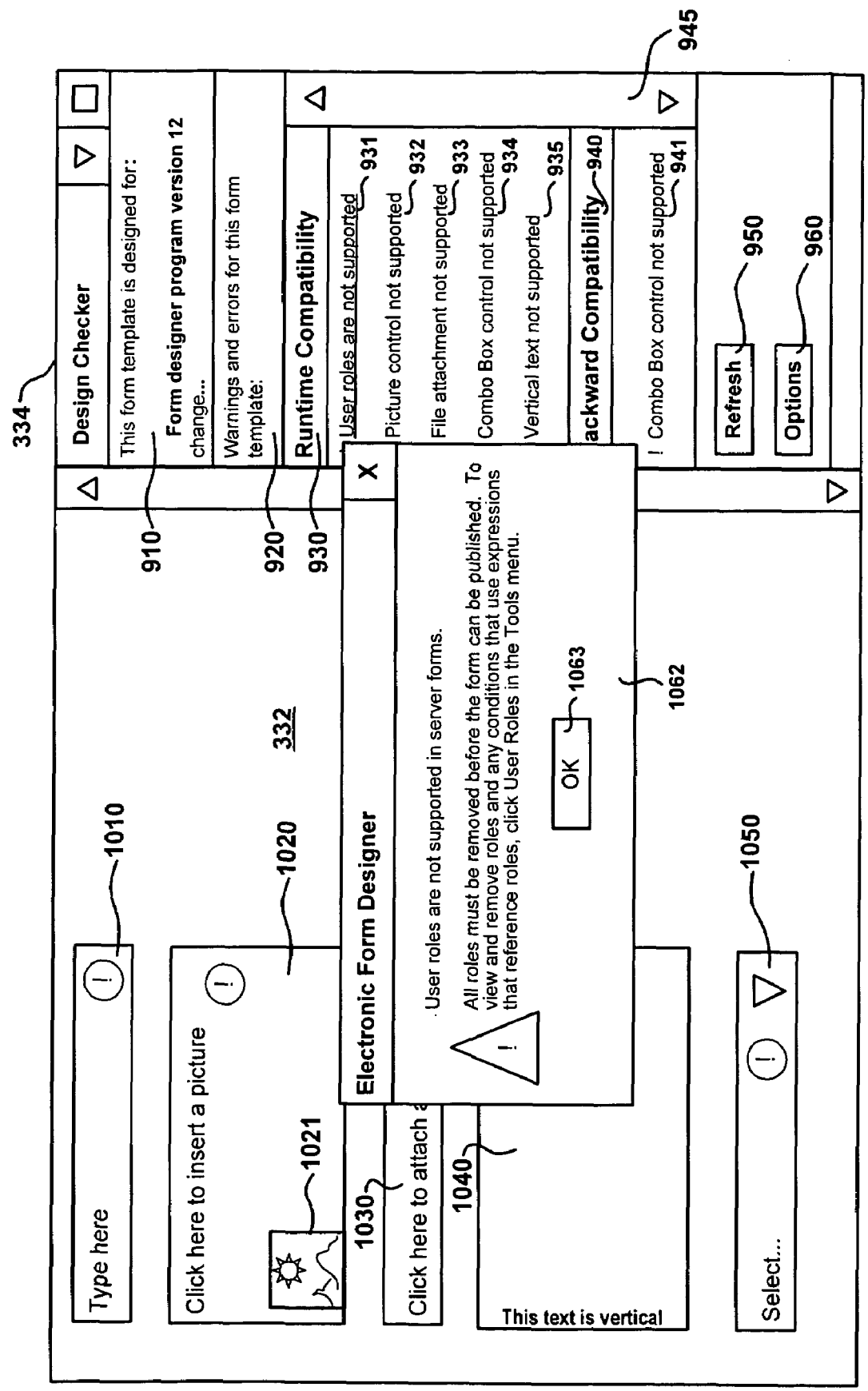
FIG. 11 is a diagram of one embodiment of a design canvas and design checker task pane of the present system for identifying design issues in electronic forms.

In one embodiment, in response to a user interaction with a displayed global design issue, a dialog message further describing the particular nature of the global design issue will be presented to the user. FIG. 11 shows an example of a dialog box being presented in response to a user interaction with a displayed global issue.

FIG. 11 is a diagram of one embodiment of a design canvas 332 and design checker task pane 334 of the present system 200 for identifying design issues in electronic forms. FIG. 11 shows exemplary actions that take place in response to a user interaction with a selectable design issue 931 displayed in design checker task pane 334. Items 910-960 are the same as described in conjunction with FIG. 9A, with two exceptions. First, the compatibility choice in area 910 has been altered to include server level use as a compatibility requirement for the form under design. Second, selectable item 931 has been selected by a user interaction. The text in selectable item 931 is underlined to represent this selection of item 931. Selectable item 931 is a global design issue that is related to user roles that are not supported in the form as displayed.

In design canvas 332, areas 1010, 1020, 1021, 1030, 1040, and 1050 are the same as described in FIG. 10 with the exception that area 1020 is no longer selected. In response to a user interaction with selectable design issue 931, a dialog box 1062 has been automatically opened. Dialog box 1062 provides a user with further explanation of the global design issue associated with selectable area 931. Additionally, dialog box 1062 provides the user with a suggestion on how to eliminate the error associated with selectable design issue 931. A user closes dialog box 1062 by selecting the OK button 1063.

Figure 12:
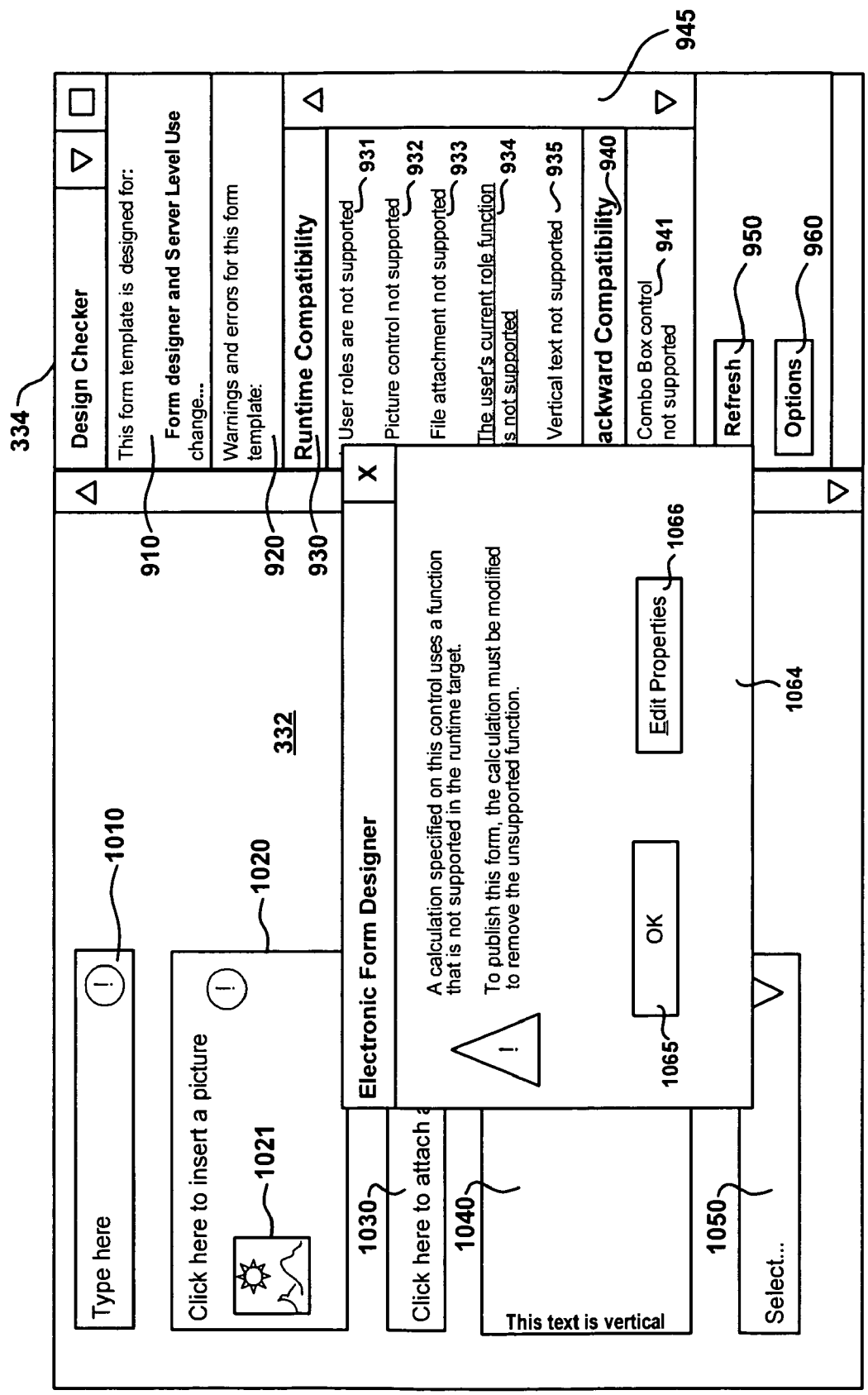
FIG. 12 is a diagram of one embodiment of a design canvas and design checker task pane of the present system for identifying design issues in electronic forms.

In one embodiment, in response to a user interaction with a displayed node centric design issue, a dialog message further describing the particular nature of the node centric design issue is presented to the user. FIG. 12 shows an example of a dialog box being presented in response to a user interaction with a displayed node centric issue.

FIG. 12 is a diagram of one embodiment of a design canvas 332 and design checker task pane 334 of the present system 200 for identifying design issues in electronic forms. FIG. 12 shows exemplary actions that take place in response to a user interaction with a selectable design issue 934 displayed in design checker task pane 334. Items 910-960 are the same as described in conjunction with FIG. 9A, with two exceptions. First, the compatibility choice in area 910 has been altered to include server level use as a compatibility requirement for the form under design. Second, selectable item 934 which now represents "The user's current role function is not supported" has been selected by a user interaction. The text in selectable item 934 is underlined to represent this selection of item 934. Selectable item 934 is a node centric design issue that is related to the user's current role function not being supported.

In design canvas 332, areas 1010, 1020, 1021, 1030, 1040, and 1050 are the same as described in FIG. 10 with the exception that area 1020 is no longer selected. In response to a user interaction with selectable design issue 934, a dialog box 1064 has been automatically opened. Dialog box 1064 provides a user with further explanation of the node centric design issue associated with selectable area 934. Additionally, dialog box 1064 provides the user with a suggestion on how to eliminate the error associated with selectable design issue 934. By selecting the edit properties button 1066 that is provided in dialog box 1064, a user is linked to an input area where the node properties associated with selectable design issue 934 can be edited or manipulated by the user to correct the identified design issue. A user closes dialog box 1064, by selecting the OK button 1065.

Referring now to FIG. 6, a flow chart 600 of operations performed in accordance with another embodiment of the present technology for identifying design issues in electronic forms is shown. The operations recited in flow chart 600 function in the same manner as the operations recited in flow chart 500, but the description of the processes varies to clearly point advantages of the present technology for identifying design issues in an electronic form.

At step 602 of FIG. 6, the present technology for identifying design issues in electronic forms receives guidelines for formatting an electronic form. Step 602 is similar to step 502 of flow chart 500, and comprises receiving a user selected runtime environment in a user interface 230. However, receiving guidelines also comprises receiving more information that just a runtime environment selection. Receiving guidelines also comprises receiving information such as a selection of a data source for the input of data into an electronic form, a selection of a version of form designer software that the form is designed to be compatible with, and information pertaining to whether on not backward compatibility issues should be reported to the user during the form design process.

A runtime environment is the destination where an electronic form is expected to be used, and can comprise an environment such as a stand-alone computer, a server, a web access point, or the like. A runtime environment can also comprise a combination of these types of environments. A data source for form data can comprise a source such as a stand-alone user input, a web service, a database, or a schema such as XML (extensible markup language). A version of software that the form is designed to be compatible with controls which, if any, backward compatibility issues are identified during the generation of the electronic form.

In one embodiment, the user interface 230 (FIG. 2) prompts a user to input guidelines for formatting the electronic form as a starting condition of the form generation process. In one embodiment, a user selectively inputs or changes guidelines for the form generation process at any time a user so chooses during the form generation process. In a case where no information is received for some or all the form generation guidelines, default settings are substituted.

At step 604 of FIG. 6, the present technology for identifying design issues in electronic forms performs a design check on the electronic form; the form design check being performed by a plurality of design checker objects 211-216 (FIG. 2) applying rules consistent with the received guidelines. Step 604 is similar to step 504 of FIG. 500 and the corresponding description of step 504 that was presented above, with one exception. The exception is that the form design checkers 211-216 in step 604 are constrained by a ruleset that is consistent with a set of guidelines, as described above in conjunction with step 602. The received guidelines provide more information than a just a runtime environment, as was specified in step 504. Due to the more specific rules that are derived from the received guidelines, more or differing potential design errors are likely to be identified by the form design checkers 211-216.

Referring now to flow chart 600 of FIG. 6, at step 606, the present technology for identifying design issues in electronic forms generates a list of potential design errors identified by the form design check. The list of potential design errors is generated in a reporting object. This step is similar to step 506 of flow chart 500, and is consistent with the description provided in step 506 with one exception. The exception is that the generated list is only comprised of potential design errors, instead of the larger category of design issues which comprises not only potential design errors, but also warnings as well. In other embodiments, step 606 is expanded to encompass a complete list of design issues comprised of warnings and any potential design errors identified as a result of the form design check.

At step 608 of FIG. 6, the present technology for identifying design issues in electronic forms displays the list of potential design errors in a single design checker task pane 334 (FIGS. 3 and 9A) of a user interface. Step 608 is similar to step 508 of flow chart 500, and the display of errors in a single design checker task pane 334 of a user interface is consistent with the description of the display of design issues provide in conjunction with step 508 and FIG. 9A.

Still referring to step 608, in one embodiment, the displayed list of potential design errors is also subdivided into categories of errors, with each of the plurality of categories of errors corresponding to at least one of the plurality of design checker objects 211-216 (FIG. 2). One embodiment also comprises the functionality to suppress display in design checker task pane 334 of at least one of the categories of errors. The suppressing takes place in response to a user selection from a dialog box associated with or accessed via the task pane, as described in step 508 (FIG. 5) and FIGS. 9B and 9C. One embodiment also comprises the functionality to refresh display of the list of potential design errors in design checker task pane 334 in response to a user selection of a selectable refresh button, such as refresh button 950 (FIG. 9A), accessed in or associated with design checker task pane 334. In an embodiment where errors and warnings are displayed together in design checker task pane 334, refresh button 950 also enables the refresh of warnings in the task pane.

At step 610 of FIG. 6, the present technology for identifying design issues in electronic forms presents a dialog box containing context specific error text; the dialog box being presented in response to a user interaction with one of the potential design errors displayed in design checker task pane 334 (FIGS. 3 and 9A). As previously described, the types of errors are classified as: display centric, node centric, and global. Although only the display centric errors are visible within the electronic form being designed, all three of these types of potential design errors are describable to the user, for instance, by linking a dialog box to the displayed error. FIGS. 10, 11, and 12, and their accompanying descriptions provide examples of dialog boxes present in response to user interaction with display centric, global, and node centric issues and errors.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for identifying design errors during an electronic form design process, said computer-implemented method comprising:

receiving, by a computing device, a guideline selected by a first user designing an electronic form in a first runtime environment, the guideline indicating a second runtime environment, the second runtime environment different than the first runtime environment, the electronic form including a set of data entry controls in a form design area, each data entry control in the set of data entry controls being capable of receiving data from a second user when the electronic form is run;

based on the guideline, automatically identifying a set of design errors, the set of design errors including a runtime compatibility error likely to occur when the electronic form is run on the second runtime environment;

after automatically identifying the set of design errors, generating a list specifying the set of design errors; and displaying, in a user interface, the list.

2. The computer-implemented method of claim 1 further comprising:

automatically selecting one of the set of data entry controls in response to the first user selecting one of the design errors in the set of design errors;

automatically scrolling the form design area such that the one of the set of data entry controls is displayed in the user interface;

highlighting the one of the set of data entry controls to provide a visual indicator of the selected design error; and presenting a dialog message in the user interface, the dialog message describing the one of the design errors in the set of design errors.

3. The computer-implemented method of claim 1 wherein said receiving the guideline comprises:

prompting the first user for the guideline as a starting condition of said electronic form design process.

4. The computer-implemented method of claim 1 wherein said receiving the guideline comprises:

receiving from the first user the guideline at any time during said electronic form design process.

5. The computer-implemented method of claim 1, wherein the set of design errors is a first set of design errors, and the computer-implemented method further comprises:

using a plurality of design checker objects to identify a second set of design errors in the electronic form, each design checker object in the plurality of design checker objects identifying in the electronic form a different type of design error, each design checker object in the plurality of design checker objects identifying in the electronic form a type of design error other than runtime compatibility errors likely to occur when the electronic form is run on the first runtime environment, the design errors in the second set of design errors belonging to a plurality of categories, each of the plurality of categories corresponding to at least one design checker object in the plurality of design checker objects;

including the second set of design errors in the list such that the list includes the first set of design errors and the second set of design errors; and displaying, in a single design checker task pane, said list subdivided into the plurality of categories.

6. The computer-implemented method of claim 5 further comprising:

suppressing displays, in the single design checker task pane, of at least one of said plurality of categories, in response to a user selection.

7. The computer-implemented method of claim 5 further comprising:

suppressing display, in said single design checker task pane, of a subset of design errors of at least one of said plurality of categories, in response to a user selection.

8. An electronic computing system for identifying design errors during an electronic form design process, said electronic computing system comprising:

a processor;

a display device; and at least one computer-usable storage medium comprising computer-executable instructions, the computer-executable instructions, when executed by the processor, cause the electronic computing system to:

display a user interface on the display device, the user interface containing a design canvas area, the design canvas area enabling a first user to design an electronic form on a first runtime environment, the electronic form including a set of data entry controls, each data entry control in the set of data entry controls being capable of receiving data from a second user when the electronic form is run;

receive a first guideline from the first user, the first guideline indicating a second runtime environment, the second runtime environment being one of a plurality of selectable runtime environments, the second runtime environment different than the first runtime environment;

receive a second guideline from the first user, the second guideline indicating a version of a form designer software application with which the electronic form is designed to be compatible;

receive a third guideline from the first user, the third guideline indicating backward compatibility errors are to be reported during the electronic form design process;

perform a runtime compatibility check, the runtime compatibility check identifying runtime compatibility errors, the runtime compatibility errors likely to occur upon utilization of the electronic form in the second runtime environment;

in response to the third guideline indicating that the backward compatibility errors are to be reported during the electronic form design process, perform a backward compatibility check to identify backward compatibility errors in the electronic form;

display, in a user interface on the display device, a list specifying a set of design errors, the set of design errors including the runtime compatibility errors and the backward compatibility errors;

automatically select one of the set of data entry controls in the design canvas area in response to the first user selecting a design error in the list;

scroll the design canvas area such that the one of the set of data entry controls is viewable in the user interface;

automatically highlight the one of the set of data entry controls to provide a visual indicator in the user interface of the selected design error in the list; and automatically present, in the user interface, a dialog message, the dialog message describing the selected design error in the list.

9. The electronic computing system of claim 8 wherein said list comprises:
a plurality of categories, each category of said plurality of categories corresponding to at least one form design checker object in a plurality of form design checker objects, each form design checker object in the plurality of form design checker objects performing a different design check from a plurality of design checks identifying types of design errors in the electronic form.

10. The electronic computing system of claim 9, wherein the instructions further cause the electronic computing system to:
display, in the user interface, an interactive design checker task pane, the interactive design checker task pane displaying said list; and
receive user inputs related to said list.

11. The electronic computing system of claim 10 wherein the instructions cause the electronic computing system to display said interactive design checker task pane such that the interactive design checker task pane comprises:
an options selector that, when selected, selectively suppresses display of a portion of one or more of said categories; and
a refresh selector that, when selected, selectively refreshes display of said list.

12. A computer-readable storage medium comprising instructions, the instructions, when executed by an electronic computer system, cause the electronic computer system to:
receive a first guideline selected by a first user designing an electronic form on a first runtime environment, the first guideline indicating a second runtime environment, the second runtime environment different than the first runtime environment used to design the electronic form, the electronic form including a set of data entry controls, each data entry control in the set of data entry controls being capable of receiving data from a second user when the electronic form is run;
after receiving the first guideline, use a plurality of design checker objects to identify a first set of design errors, the first set of design errors likely to occur if the electronic form is run on the second runtime environment;
generate a first list specifying the design errors in the first set of design errors;
display, within a single task pane of a user interface displayed on a display device, the first list;
receive a second guideline from the first user, the second guideline indicating a third runtime environment, the third runtime environment different than the first runtime environment, the third runtime environment different than the second runtime environment;
after receiving the second guideline, automatically identify a second set of design errors, the second set of design errors likely to occur when the electronic form is run on the third runtime environment, the second set of design errors being different than the first set of design errors;
generate a second list, the second list specifying the design errors in the second set of design errors; and
display, within the single task pane, the second list.

13. The computer-readable storage medium of claim 12, the instructions further causing the electronic computer system to: in response to a user selection of one of said design errors displayed in said single task pane, display, in the user interface, a dialog box, the dialog box containing context-specific error text.

14. The computer-readable storage medium of claim 13, said instructions which when executed cause said electronic computer system to display the dialog box further cause the electronic computer system to: display, in the user interface, a user-selectable link within said dialog box, said user-selectable link coupled to an input area wherein a node property described by said content-specific error text can be manipulated by said first user.

15. The computer-readable storage medium of claim 12 wherein said instructions further cause the electronic computer system to:
receive a third guideline, the third guideline specifying a first version of a form designer software application, the first version of the form designer software application being a version of the form designer software application with which the electronic form is designed to be compatible; and
identify a set of backward compatibility errors; and
display, within the first list, the backward compatibility errors.

16. The computer-readable storage medium of claim 12 wherein said instructions further cause the electronic computer system to prompt the first user for said first guideline as a starting condition of an electronic form design process.

17. The computer-readable storage medium of claim 12 wherein said instructions which when executed cause said electronic computer system to display said first list further comprise instructions that cause the electronic computer system to: display, in the user interface, said first list subdivided into a plurality of categories, each category in said plurality of categories corresponding to at least one design checker object from the plurality of design checker objects, wherein each of the plurality of design checker objects identifying a different type of design error in the electronic form.

18. The computer-readable storage medium of claim 17 wherein said instructions which when executed cause said electronic computer system to display said first list subdivided into the plurality of categories further comprise instructions that cause the electronic computer system to : suppress display, in the user interface, in said single task pane of at least one of said categories, in response to a user selection from a dialog box displayed in said single task pane.

19. The computer-readable storage medium of claim 17 wherein said instructions which when executed cause said electronic computer system to display said first list subdivided into the plurality of categories further comprise instructions that cause the electronic computer system to: refresh display in the user interface, of said first list in said single task pane in response to a user selection of a selectable refresh button in said single task pane.

* * * * *